United States Patent
Kobayashi et al.

(10) Patent No.: US 8,485,460 B2
(45) Date of Patent: Jul. 16, 2013

(54) POLYESTER FILM ROLL

(75) Inventors: Ieyasu Kobayashi, Kanagawa (JP);
Mitsuo Tojo, Kanagawa (JP); Tsuyonari Nohira, Kanagawa (JP); Shinji Muro, Kanagawa (JP); Hirofumi Murooka, Kanagawa (JP)

(73) Assignee: Teijin Limited, Tokyo (JP)

( * ) Notice: Subject to any disclaimer, the term of this patent is extended or adjusted under 35 U.S.C. 154(b) by 2452 days.

(21) Appl. No.: 09/914,033

(22) PCT Filed: Dec. 18, 2000

(86) PCT No.: PCT/JP00/08958
§ 371 (c)(1),
(2), (4) Date: Aug. 22, 2001

(87) PCT Pub. No.: WO01/48061
PCT Pub. Date: Jul. 5, 2001

(65) Prior Publication Data
US 2004/0069885 A1   Apr. 15, 2004

(30) Foreign Application Priority Data

Dec. 28, 1999 (JP) .................................... 11-372528
May 29, 2000 (JP) ................................. 2000-158034

(51) Int. Cl.
*B65H 18/28*  (2006.01)
(52) U.S. Cl.
USPC ...................................................... 242/160.4
(58) Field of Classification Search
USPC ...................................................... 242/160.4
See application file for complete search history.

(56) References Cited

U.S. PATENT DOCUMENTS 3,427,723 A * 2/1969 Blanchard et al. .............. 33/554
3,873,664 A * 3/1975 Curtis et al.
4,576,344 A * 3/1986 Sasaki et al.
4,661,421 A * 4/1987 Ishikuro et al.

(Continued)

FOREIGN PATENT DOCUMENTS

JP  39-14534 B  7/1964
JP  48-43772    6/1973

(Continued)

OTHER PUBLICATIONS

Japanese Office Action mailed May 30, 2006 for corresponding Japanese Patent Application 2001-548596.

*Primary Examiner* — William A Rivera
(74) *Attorney, Agent, or Firm* — Rader, Fishman & Grauer PLLC

(57) ABSTRACT

A polyester film roll is rolled on a core, wherein the difference R (m) between the maximum value and the minimum value of the diameters of the roll is not more than $2W \times 10^{-3}$ and not more than $L \times 10^{-7}$, when the diameters of said roll are measured in the width direction of the roll, (therein, W is the width (m) of the film roll, and L is the length (m) of the rolled film). Alternatively, among the lengths of lines which are obtained by measuring the diameters of said roll in the width direction of the roll, drawing a straight line between both the ends of the curved line of the obtained roll diameters, the maximum distance on the convex portion between the curved and straight lines is not more than 500 μm, and the maximum distance on the concave portion of the same is not more than 300 μm.

24 Claims, 3 Drawing Sheets

U.S. PATENT DOCUMENTS

| | | | |
|---|---|---|---|
| 4,911,951 A * | 3/1990 | Ogawa et al. | 427/130 |
| 5,051,291 A * | 9/1991 | Kawahara et al. | 428/141 |
| 5,106,681 A * | 4/1992 | Endo et al. | 428/323 |
| 5,308,010 A * | 5/1994 | Hakiel | |
| 5,399,407 A * | 3/1995 | Hatanaka et al. | 428/64.6 |
| 5,441,800 A * | 8/1995 | Utsumi | |
| 5,629,141 A * | 5/1997 | Kawamoto | |
| 5,795,705 A * | 8/1998 | Kawamoto | 430/501 |
| 5,919,550 A * | 7/1999 | Koseki et al. | |
| 5,998,002 A * | 12/1999 | Harada et al. | 428/216 |
| 6,203,934 B1 * | 3/2001 | Naoe et al. | 428/840.6 |
| 6,444,290 B1 * | 9/2002 | Takahashi et al. | 428/141 |
| 6,485,818 B2 * | 11/2002 | Fujita | 428/220 |
| 6,498,627 B1 * | 12/2002 | Hershey et al. | |

FOREIGN PATENT DOCUMENTS

| | | |
|---|---|---|
| JP | 50-058167 | 5/1975 |
| JP | 52-47070 | 4/1977 |
| JP | 54-56674 | 5/1979 |
| JP | 59-95116 | 6/1984 |
| JP | 59-171623 | 9/1984 |
| JP | 61-261026 | 11/1986 |
| JP | 62-036261 | 2/1987 |
| JP | 62-175378 | 8/1987 |
| JP | 63-225055 | 9/1988 |
| JP | 01-95025 | 4/1989 |
| JP | 01-295822 | 11/1989 |
| JP | 02-194924 | 8/1990 |
| JP | 02-208323 | 8/1990 |
| JP | 03-207727 | 9/1991 |
| JP | 06-039904 | 2/1994 |
| JP | 36-22875 B | 11/1996 |
| JP | 09-143352 | 6/1997 |
| JP | 10-275324 | 10/1998 |
| JP | 11-207804 | 8/1999 |
| JP | 2000-211016 | 8/2000 |

* cited by examiner

| Slacks<br>·Outbreaks of Slacks with passage of time | Longitudinal Wrinkles<br>·Outbreaks of Longitudinal Wrinkles with passage of time |

POLYESTER FILM ROLL

TECHNICAL FIELD

The present invention relates to a polyester film roll, in more detail, to a polyester film roll which is free from the generation of wrinkles on the film and has a good roll appearance.

BACKGROUND ART

The polyester films have excellent in strengths, dimensional stability, and so on, and have widely been used for magnetic recording media, capacitors, packages and printing materials. Video tapes, audio tapes, computer tapes, and soon, are widely known as the magnetic recording media using the polyester films as supports (base films).

High density recordings on the magnetic recording media are progressed in recent years, accompanied by the formation of thin and flat base films. However, it is difficult to roll a thin flat film in a roll-like shape in a good rolled appearance. Even when the thickness of a film is slightly uneven, the unevenness of the film is accumulated, when rolled in the roll-like shape. Consequently, the thin portion of film is deformed into a wrinkle-like shape, and the thick portion of the film is extended and forms slacks, when the film is unrolled, whereby troubles are caused when the film is subjected to a processing such as a coating processing or a vacuum-deposition processing.

In order to solve the problems, various techniques such as the improvement in the surface characteristics of a film [JP-A 59-95116 (hereafter, JP-A means Japanese unexamined patent publication), JP-A 59-171623, JP-A 2-194924, JP-A 3-207727, and so on], the reduction of thickness unevenness (JP-A 48-43772, JP-A 52-47070, JP-A 54-56674, JP-A 1-95025, JP-A 1-295822, and so on), or the dispersion of the thickness unevenness into the width direction by oscillation (JP-A 36-22875, JP-A 39-14534, and so on] have been proposed.

DISCLOSURE OF THE INVENTION

However, the conventional techniques had problems such as a problem in which the characteristics of the film have to be changed, a problem in which wrinkles or slacks are generated with the passage of time, even when the film does not have a problem in a rolled state, and a problem in which a technique can not be applied to a practical production, because the development of the technique is extremely difficult. Especially, such the problems have been actualized, when the films are thinned and flattened.

The purposes of the present invention is to improve the problems, and to provide a polyester film roll which does not change the characteristics of the film, is free from the generation of wrinkles and slacks which are generated with the passage of time, and has a good roll appearance.

According to the present invention, the above-described purposes and advantages of the present invention are achieved, firstly, by a polyester film roll (hereinafter often referred to as the first polyester film roll) in which a polyester film is rolled on a core, characterized in that the difference R (m) between the maximum value and the minimum value is not more than $2W \times 10^{-3}$ and not more than $L \times 10^{-7}$, when the diameters of said roll are measured in the width direction of the roll. Therein, W is the width (m) of the film roll, and L is the length (m) of the rolled film.

According to the present invention, the above-described purposes and advantages of the present invention are achieved, secondly, by a polyester film roll (hereinafter often referred to as the second polyester film roll) in which a polyester film is rolled on a core, characterized in that, among the lengths of lines which are obtained by measuring the diameters of said roll in the width direction of the roll, drawing a straight line between both the ends of the curved line of the obtained roll diameters, and then vertically drawing the lines from said curved line to said straight line, the maximum length (maximum convex portion) on the convex portion side from said straight line is not more than 500 μm, and the maximum length (maximum concave portion) on the concave portion side from said straight line is not more than 300 μm.

EMBODIMENT OF THE INVENTION

Figure 1A:
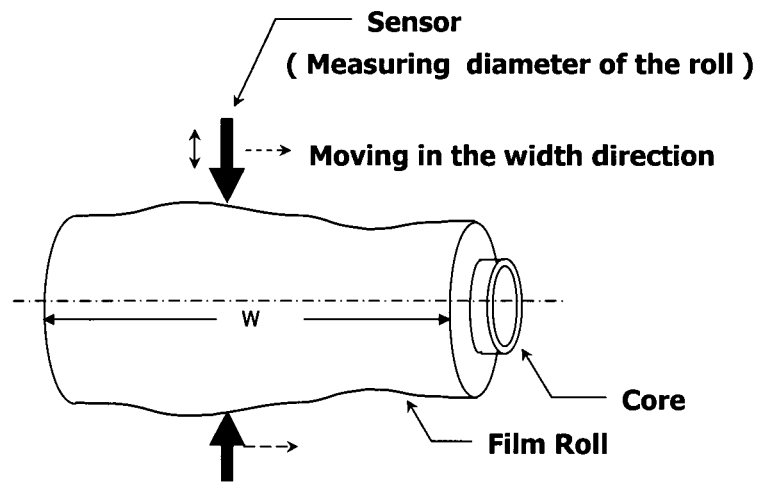
FIG. 1A shows the method of measuring roll diameters in the width direction of the film roll.
Figure 1B:
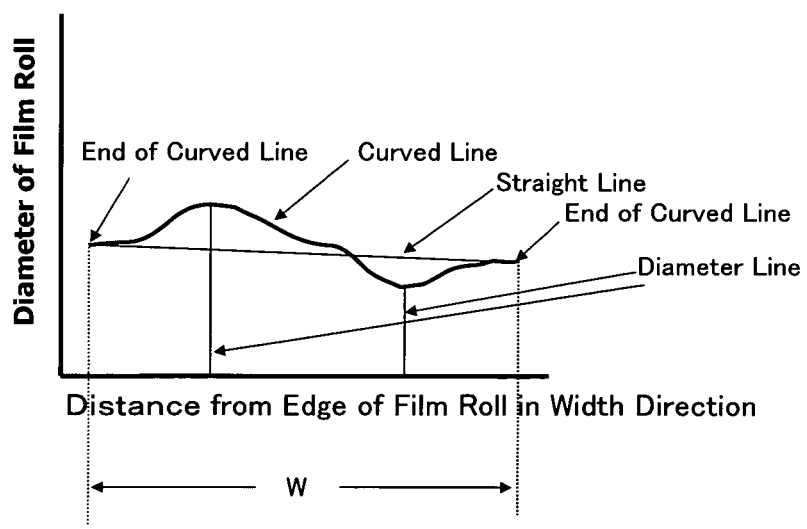
FIG. 1B shows the diameters of the film roll/distance from the edge of film roll in the width direction.
Figure 2:
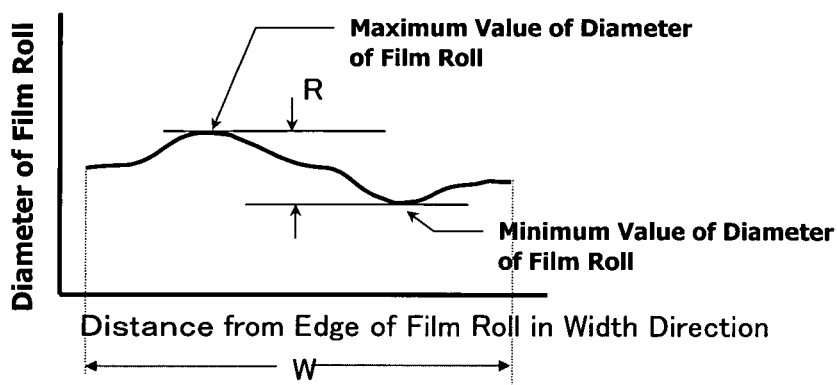
FIG. 2 is a diagram showing the difference R between the maximum diameter value of the film roll and the minimum diameter value of the film roll. W is the width of the film roll, and L is the rolled length of the film roll.
Figure 3:
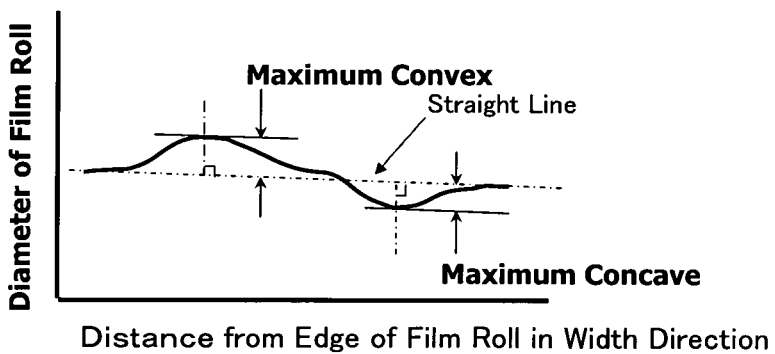
FIG. 3 is a diagram showing a curved line with two ends corresponding to all the diameters of the film roll along the width direction of the roll, a straight line connecting the two ends of the curved line, a first perpendicular line (with respect to the straight line) intersecting the straight line and the maximum convex area of the curve line, and a second perpendicular line (with respect to the straight line) intersecting the straight line and the maximum concave area of the curve line.
Figure 4:
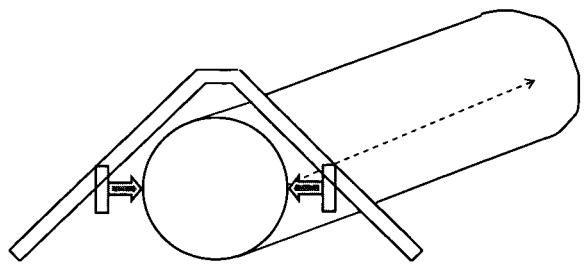
FIG. 4 shows the measurement of all the diameters of the film roll along the width direction of the roll.
Figure 5:
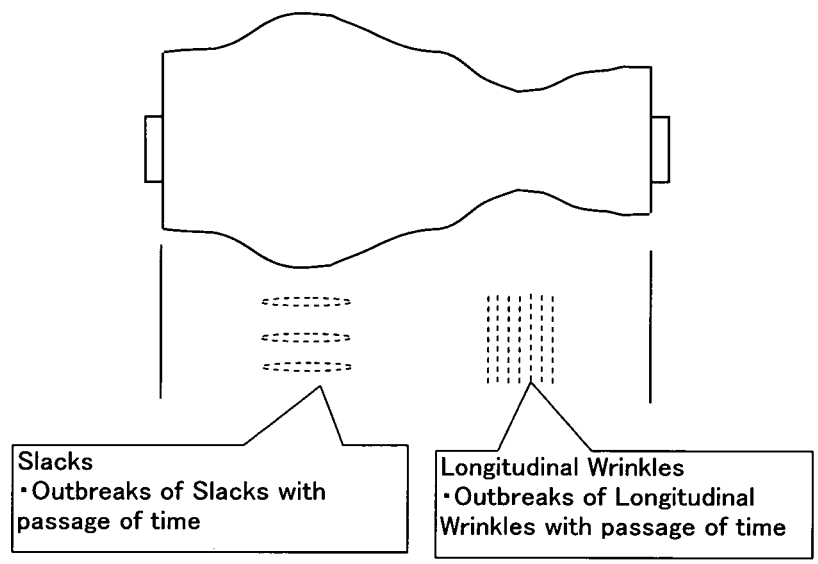
FIG. 5 shows an image of the shape of the film roll.
Figure 6:
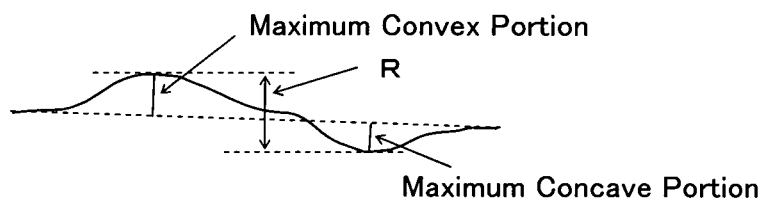
FIG. 6 shows the definitions of the shape of the film roll in terms of the image shown in FIG. 5.

Hereinafter, the first polyester film roll of the present invention will be explained.

The polyester film in the present invention may be an unoriented film or a monoaxially oriented film, but is preferably a biaxially oriented film especially oriented in the longitudinal direction (machine direction) and in the width direction (transverse direction).

The polyester film includes films comprising aromatic polyesters (homopolymers) represented by polyethyelene terephthalate, polyethylene 2,6-naphthalenedicarboxylate, and polybutylene terephthalate, or the films of these copolymers. Among the polymers, the polyethylene terephthalate and the polyethylene 2,6-naphthalenedicarboxylate are preferable from the viewpoint of uniform film-forming properties.

The polyester film may be a mono-layered film or a laminate film comprising two or more layers, and may be a balanced film whose mechanical properties are approximately equal in two axial directions or a reinforced film which is reinforced in one axial direction.

The polyester film may contain inner deposited particles deposited on the polymerization of the polyester, and inactive particles added before the formation of the film, such as inactive inorganic particles represented by calcium carbonate particles, alumina particles, spherical silica particles, and titanium oxide particles, and organic particles represented by cross-linked silicone resin particles, cross-linked polystyrene resin particles, cross-linked acrylic resin particles, cross-linked polyester resin particles, cross-linked styrene-acrylic resin particles, polyimide particles, melamine resin particles.

The average particle diameter of these inactive particles is preferably not less than 0.01 μm and not more than 2.0 μm. The lower limit of the average particle diameter is further preferably 0.05 μm, furthermore preferably 0.1 μm, while the upper limit is further preferably 1.0 μm, furthermore preferably 0.7 μm. The content of the inactive particles is preferably not less than not less than 0.001 percent by weight and not more than 2.0 percent by weight. The lower limit of the content is further preferably 0.005 percent by weight, furthermore preferably 0.01 percent by weight, while the upper limit is further preferably 1.0 percent by weight, furthermore 0.5 percent by weight.

The polyester film roll in the present invention is the film roll which the polyester film is rolled on the core, and needs that the difference R (m) between the maximum value and the minimum value is not more than $2W \times 10^{-3}$ and not more than $L \times 10^{-7}$, when the diameters of said roll are measured in the width direction of the roll. Preferably, R (m) is preferably not more than $1.5W \times 10^{-3}$ and not more than $(L/1.5) \times 10^{-7}$. Therein, W is the width (m) of the film roll, and L is the length (m) of the rolled film.

In the case of not satisfying the above-described equations, the polyester film roll is not preferable, because the accumulated thickness unevenness of the roll shape is enlarged, thereby easily generating wrinkles on the roll in the thin portion of the film and easily extending the thick portion to generate slack on the film, when the film is unrolled from the roll. Even when the polyester film roll does not have a local uneven portion in the profile of the roll shape but when the whole shape of the polyester film roll is obliquely inclined, the polyester film roll is also not preferable, because one side (on the larger outer diameter side of the roll) of the film is slackened on the unrolling of the film from the roll and because the rolling of the film is shifted on the rolling of the film in the next process, although wrinkles are scarcely generated.

A method for producing the above-described polyester film roll is especially not limited, but preferably includes a method comprising measuring the thickness of the continuously produced and traveling film in high accuracy or measuring the roll shape values (outer diameters) of the rolled film roll in the width direction, and then feeding back the measured values to adjust the temperature and gap of die lips so as to satisfy the shape of the roll of the present invention, thus adjusting the thickness of the film. The former high accuracy measurement method is the most ideal method, because of enabling the control in high response, but the latter method can be combined with a conventional thickness unevenness-adjusting method and also has advantages that the accuracy shortage of said method is covered and that an increase in the cost is restrained. In the former method for measuring the thickness of the traveling film, a non-contact type hardness meter generally used online, such as a transmitted β-ray attenuation method thickness meter, a transmitted infrared light attenuation method thickness meter, or an optical interferencial spectoscopy thickness meter, is used. In the latter roll shape method, a stylus type thickness meter, a non-contact laser type thickness meter, or the like, is also used.

The degree of rolling hardness of the polyester film roll in the present invention is preferably not less than 90 and not more than 100, further preferably not less than 95 and not more than 100. When the degree of rolling hardness is less than 90, the polyester film roll tends to generate wrinkles with the passage of time, and is further liable to cause the slippage of the rolled film.

The width and length of the polyester film in the present invention are especially not limited, but are generally 0.300 to 1.500 m and 3,000 to 30,000 m, respectively, from the viewpoint of productivity in an industrial scale. The effects of the present invention especially remarkably appear on the roll of a film having a width of not less than 0.400 m and a length of not less than 5,000 m. The thickness of the film is preferably not less than 0.5 μm and not more than 20 μm, further preferably not less than 3 μm and not more than 10 μm. A film having a thickness of less than 0.5 μm is inferior in a rolling property because the rigidity of the film is extremely low, while a film having a thickness of more than 20 μm has high rigidity, therefore they scarcely express the effects of the present invention.

The surface roughness Ra of the polyester film in the present invention is preferably not less than 0.1 nm and not more than 10 nm, further preferably not less than 0.3 nm and not more than 8 nm, especially preferably not less than 0.3 nm and not more than 5 nm. When the Ra of the polyester film is less than 0.1 nm, the polyester film is not preferable, because the polyester film has an inferior slipping property and gives only film rolls having extremely inferior rolled appearances. On the other hand, a coarse polyester film having a Ra of more than 10 nm hardly becomes the target of the present invention, because the polyester film scarcely generates wrinkles, even when the shape of the roll does not satisfy the conditions of the present invention.

The outer diameter of the roll-shaped core of the polyester film roll in the present invention is especially not limited, but is usually 0.100 to 0.400 m. When the outer diameters of the roll shape of the core are measured in the width direction of the core, the difference in the outer diameters along the core between the maximum outer diameter of the core and the minimum outer diameter of the core is preferably not more than $300 \times 10^{-6}$ m, further preferably $200 \times 10^{-6}$ m. When the difference in the outer diameters along the core exceeds $300 \times 10^{-6}$ m, the core is not preferable, because wrinkles and slacks are generated in the film roll by the effect of the core, even when the thickness unevenness of the polyester film is small. The roll shape of the core is desirably a crown shape in which the central portion of the core in the width direction and both the end portions of the core are thick and thin, respectively. The crown shape facilitates the outward removal of air between the films and the inhibition of wrinkle generation, when the polyester film is rolled. In the core of the crown shape, the difference between the diameter of the central portion of the core and the diameters of both the end portions of the core is preferably in the range of 0 m to $300 \times 10^{-6}$ m.

As a material for the above-described core, paper, a plastic or the like may be used, but a fiber-reinforced plastic is preferably used from the viewpoint of strength. The core produced from the fiber-reinforced plastic includes a core produced by winding around, for example, carbon fibers or glass filaments in a cylindrical shape, impregnating the cylindrical product with a thermosetting resin such as an unsaturated polyester resin and then curing the impregnation product.

The flexural modulus of the above-described core in the circumferential direction is preferably not less than 13 GPa, further preferably not less than 14 GPa. When the core having the flexural modulus not satisfying the range is used, the core is often deformed by a tension and a contact pressure generated when the polyester film is rolled. A method for adjusting the strength of the core within the range is especially not limited, but the strength of, for example, a carbon fiber-reinforced plastic core can be adjusted by suitably selecting the amount of the carbon fibers, and a desired strength is further obtained by adjusting the thickness of the core.

The surface roughness Ra of the above-described core is preferably not more than 0.6 μm, further preferably not more than 0.3 μm. When a core not satisfying the range is used, the surface roughness of the core is transferred to the surface of a polyester film. Thereby, when the core is used for, for example, a film which is used for a high recording density magnetic tape severely demanding the flatness of the film, the electromagnetic transducing properties of the magnetic tape is sometimes remarkably deteriorated. A method for controlling the surface roughness of the core within the range is especially not limited, but a desired surface roughness is obtained, for example, by disposing a resin layer on the surface of the core and then grinding the surface of the resin layer in good accuracy.

The degree of surface hardness of the core is preferably not less than 65 degree, further preferably not less than 70 degree. When a core not satisfying the range is used, the core is often deformed by a tension and a contact pressure generated on the rolling of the polyester film, and the deformation is often transferred to the film to produce a defective flat surface. A method for adjusting the degree of surface hardness of the core within the range is especially not limited, but the degree of surface hardness of the core can be adjusted by using a hard resin such as an epoxy resin on the surface of the core and then suitably selecting the thickness.

The polyester film roll in the present invention is especially effective as a film roll for magnetic recording media which demand good flatness. The polyester film roll is effective as a polyester film roll for digital recording method magnetic recording media among the magnetic recording media. Furthermore, among them, the polyester film roll in the present invention is effective as a polyester film roll, for magnetic recording media of ferromagnetic metal thin film layers, whose magnetic layer-formed side film surfaces demand the ultimate flatness, and whose non-magnetic side film surfaces also demand flatness from the viewpoint of thermal deterioration on vacuum deposition, besides maintaining of a rolling-up property.

The degree of rolling hardness of the polyester film roll in the present invention is preferably adjusted to not less than 90 and not more than 100 to prevent the generation of wrinkles with the passage of time and the slippage of the rolled film as described above. In order to obtain the roll having such the degree of hardness, the polyester film is preferably rolled under conditions comprising a rolling tension of 5 to 20 kg/m, a rolling contact pressure of 50 to 200 kg/m, a rolling speed of 20 to 200 m/minute, further preferably 40 to 200 m/minute. When the polyester film roll is used as a magnetic recording medium, a coating layer for facilitating the adhesion or slipping of the polyester film is very often disposed on the magnetic layer-forming side surface of the polyester film. Therein, the polyester film is preferably rolled so that the magnetic layer-forming side surface of the film is arranged on the inner side to prevent the coating layer from being shaven with a contact pressure roll of a slitter.

Subsequently, the second polyester film roll of the present invention will be explained.

On the second polyester film, it should be understood that the descriptions on the first polyester roll may be applied as such to matters not described below.

The polyester film roll in the present invention is a polyester film roll in which a polyester film is rolled on a core, and which, among the lengths of lines which are obtained by measuring the diameters of said roll in the width direction of the roll, drawing a straight line between both the ends of the curved line of the obtained roll diameters, and then vertically drawing the lines from said curved line to said straight line, the maximum length (maximum convex portion) on the convex portion side from said straight line is not more than 500 μm, preferably not more than 400 μm, especially preferably not more than 300 μm, and the maximum length (maximum concave portion) on the concave portion side from said straight line is not more than 300 μm, preferably not more than 200 μm, especially preferably not more than 150 μm.

When the maximum convex portion exceeds 500 μm, the film at the place is extended to cause problems such as the generation of Caterpillar rut-like wrinkles (slacks), the deterioration of the flatness, the failure in the formation of an uniform coating film, the generation of wrinkles to make it impossible to uniformly calender the film, when the film is calendered, and the generation of magnetic tapes having smaller widths than a desired width, when slit into magnetic tapes. When the maximum concave portion exceeds 300 μm, air is accumulated at the portion in the width direction of the roll and causes problems such as the formation of longitudinal wrinkles, when the air is removed, the failure in the formation of an uniform coating film, and the failure in a uniform calendering operation, when the film is calendered.

The method for producing the above-described polyester film roll is especially not limited, but preferably includes methods comprising measuring the thickness of a continuously formed traveling film in high accuracy, or using a die having a narrowed lip heater distance so as to enable the fine control in the thickness of the film, or properly setting an oscillation width on a slitting operation, or adjusting the thickness of the film by measuring the roll shape values (diameters) of the rolled film roll in the width direction of the roll, and then by feeding back the measured values to adjust the temperature and gap of the die lips so as to satisfy the roll shape of the present invention. The former highly accurate measuring method is the most ideal method, because the thickness of the film can be controlled in high response. But, the latter method can be combined with conventional thickness unevenness-adjusting methods, and has advantages that the shortage in the accuracy of the method can be covered and that an increase in the cost can be restrained. A non-contact method hardness meter, generally used online, such as a transmitted β-ray attenuation method thickness meter, a transmitted infrared light attenuation method thickness meter, or an optical interferencial spectoscopy thickness meter, is used for measuring the thickness of the traveling film by the former method. And a stylus type thickness meter, a non-contact laser type thickness meter, or the like, is used for the latter roll shape method.

The width and length of the polyester film in the present invention are especially not limited, but the width and the length are generally not less than 300 mm and not more than 1,500 mm, and not less than 3,000 m and not more than 30,000 m, respectively, from the viewpoint of productivity in an industrial scale. The effects of the present invention especially remarkably appear on the roll of a film having a width of not less than 500 mm and a length of not less than 4,000 m. Also, the effects especially remarkably appear on the roll of a film having a thickness of not less than 2 μm and not more than 10 μm, further preferably of not less than 3 μm and not more than 8 μm, especially preferably of not less than 4 μm and not more than 7 μm. A film having a thickness of less than 2 μm is difficult to be used as the support of a magnetic recording medium, because the rigidity of the film is extremely lowered, while a film having a thickness of more than 10 μm is difficult to become the target of the present invention, because the film has a high rigidity and gives a relatively good rolled appearance.

The polyester film in the present invention exhibits the remarkable effects, when at least one surface roughness Ra of the polyester film is preferably not less than 0.1 nm and not more than 10 nm, further preferably not less than 0.3 nm and not more than 8 nm, especially preferably not less than 1 nm and not more than 6 nm. The polyester film having a surface roughness Ra of less than 0.1 nm is not preferable, because the polyester film has an inferior slipping property and gives only film rolls having extremely inferior rolled appearances. On the other hand, a coarse polyester film having a Ra of more than 10 nm hardly becomes the target of the present invention, because the polyester film scarcely generates wrinkles even when the shape of the roll does not satisfy the conditions of the present invention.

The outer diameter of the roll-shaped core of the polyester film roll in the present invention is especially not limited, but is usually 80 to 200 mm. And, it is preferable to use the core, wherein, among the lengths of lines which are obtained by measuring the diameters of the film-rolling portion of the core in the width direction of the core, drawing a straight line between both the ends of the curved line of the obtained core diameters, and then vertically drawling the lines from said curved line to said straight line, the maximum length (maximum convex portion) on the convex portion side from said straight line is not more than 400 μm, preferably not more than 200 μm, especially preferably not more than 100 μm, and the maximum length (maximum concave portion) on the concave portion side from said straight line is not more than 200 μm, preferably not more than 100 μm, especially not more than 50 μm. Even when the thickness unevenness of the polyester film is little, the core in which the maximum convex portion exceeds 400 μm or in which the maximum concave portion exceeds 200 μm is not preferable, because longitudinal wrinkles and slacks are generated on the film roll by the effect of the core.

As described above, it should be understood that the descriptions on the first polyester film roll are applied as such to matters not described herein on the second polyester film roll of the present invention.

(The Uses of the Polyester Film Roll)

In the present invention, as understood from the above-described explanations, the polyester films obtained from the first polyester film roll and the second polyester film roll can advantageously be used as supports (base films) for magnetic recording media, capacitors, packages, printing materials, and so on, especially as supports for high density magnetic recording media (video tapes, audio tapes, computer tapes, and so on).

EXAMPLES

Hereinafter, the present invention will further be explained with examples, but the present invention is not limited to the below-described examples, so long as not exceeding the essential points of the present invention. And, the characteristic values were measured by the following methods.

Polyethylene terephthalate of raw material is melted and extruded in a filmy shape by the use of an extruder, cooled, oriented in the machine direction at a draw ratio of 3 to 6, and then oriented in the transverse direction at a draw ratio of 3 to 6. Between the machine-direction orienting process and transversely orienting process a coating liquid may be coated on the side of the film to dispose a coating layer. The film may further be reoriented in the machine direction and in the transverse direction. The film is then thermally set to form the polyester film having a thickness in a range of 0.5 to 20 μm, preferably in a range of 2 to 10 μm, which is rolled, for example, as a jumbo roll. Therein, as described above, the thickness of the traveling film is accurately measured by an online measuring method, or the roll shape values of the rolled film roll in the width direction are measured. The measured values are fed back for the adjustment of the temperature and gap of die lips so as to satisfy the roll shape of the present invention, thus adjusting the thickness of the film. The film is slit into films having prescribed widths and lengths by the use of a slitter. When the film is slit, the jumbo roll may be oscillated to disperse the thickness unevenness in the width direction. By the oscillation, roll shape defects due to small thickness unevenness can be reduced. When the film is slit, the obtained films are adhered to cores with a paste, adhesive tapes, or a liquid such as water or an alcohol. The obtained films are rolled in a prescribed length, while a desired rolling tension and a desired rolling contact pressure are applied to the films with the slitter.

(1). The Surface Roughness Ra of the Film

According to JISB 0601, the center line average roughness of the film is determined with a stylus type surface roughness meter (surfcoder SE30FAT) manufactured by (Ltd.) Kosaka Kenkyusho under conditions comprising a stylus tip radius of 2 μm, a measuring pressure of 30 mg, a cutoff of 0.08 mm and a measuring length of 1.25 mm. The measurements are carried out four times, and the average value is used as the surface roughness Ra of the film.

(2). The Shapes of the Polyester Film Roll and the Core in the Width Direction (2-1). The Case of the First Polyester Film Roll The roll shape of the film roll is measured with a bulk shape measurer manufactured by Kitano Kikaku (Ltd.) in the width direction, and a difference between the maximum outer diameter of the roll and the minimum outer diameter of the roll is determined from the measured diameters. The maximum and minimum outer diameters of the roll are determined by measuring diameters of the roll at three positions at a distance of 120 degree in the circumferential direction and then the measured diameters are averaged. The measured data in the ranges of both the ends of the film roll to 0.010 m positions are deleted to remove the effects of the high edges of the film end surfaces.

(2-2). The Case of the Second Polyester Film Roll

The roll shape of the film roll is measured with a bulk shape measurer manufactured by Kitano Kikaku (Ltd.) in the width direction, and a curved line showing the change of the diameters is determined. Each diameter is determined by measuring diameters at three positions at a distance of 120 degree in the circumferential direction and then the measured values are averaged. Both the ends of the curved line are bound to each other to form a straight line. Lines are vertically drawn from convex portions to the obtained straight lines, and the maximum convex portion is determined. Lines are also vertically drawn from concave portions to the straight line, and the maximum concave portion is determined. The measured data in the ranges of both the ends of the film roll to 0.01 m positions are deleted to remove the effects of the high edges of the film end surfaces.

The film-rolling portion of the core on which the film is rolled is also measured as described above, and the maximum convex portion and the maximum concave portion are determined.

(3). The Degree of Surface Hardness of the Polyester Film Roll

A hardness tester, type C, manufactured by Kobunshi Keiki (Ltd.) is pressed on the polyester film roll to measure the degree of surface hardness. Measuring points are totally 15 measuring points which consist of three measuring points at a distance of 120 degree in the circumferential direction at each of five points in the width direction of the polyester film roll (wherein the width obtained by removing both the 0.010 m long end widths from the overall width of the roll is divided into five equal portions, and the measurements are carried out at the three measuring positions in the center of each of the equal portions).

(4). The Flexural Modulus of the Core in the Circumferential Direction

The flexural modulus is determined by measuring the deflection of a ring-like test piece (width: 50 mm) with a universal tester, when a load is applied to the test piece in the circumferential direction, and then substituting the measured value into the following equation.

$$E\gamma = 0.149 Pr^3/(\delta I)*10^{-3},$$

wherein, cross-sectional secondary moment $I = 50t^3/12$ $E\gamma$; elastic modulus (GPa) in the circumferential direction
P; load (N)
r; central diameter (mm)
$\delta$; deflection (mm)
t; core thickness (mm).

(5). The Degree of Surface Roughness Rac of the Core

According to JIS B0601, the degree of surface roughness Rac of the core is determined by measuring a degree of central line average roughness at the center of the core in the width direction and at two positions apart from both the ends at distances of 0.050 m with cutoffs of 0.25 mm, respectively, by the use of Surfcom 111 A, a surface roughness meter of Tokyo Seimitsu (Ltd.) and then averaging the measured values.

(6). The Degree of Surface Hardness of the Core

According to the JIS K7215, the degree of surface hardness of the core is determined by pressing a hardness tester, type D manufactured by Kobunshi Keiki (Ltd.) on the center of the core in the width direction and on places apart from both the ends of the core at distances of 0.050 m, respectively, to measure the degrees of surface hardness at the three positions and then averaging the measured values.

(7). Young's Modulus

The Young's modulus is determined by cutting off a test piece having a width of 10 mm and a length of 150 mm from the film, pulling the test piece at a distance of 100 mm between the chucks of an instron type universal tensile tester at a pulling rate of 10 mm/minute and at a chart rate of 500 mm/minute and then calculating the Young's modulus from the tangential line at the standing-up portion of the obtained load-elongation curve.

Comparative Example 1

The pellets of polyethylene 2,6-naphthalenedicarboxylate substantially not containing inactive particles were dried at 170° C. for 6 hours, fed into an extruder and then melted at 305° C. The melted polymer was filtered by a known method, extruded from the extruder into a sheet-like product, and then quenched and solidified on a casting drum to produce the non-oriented film. Subsequently, the non-oriented film was preliminarily heated at 120° C., machine-direction oriented between a low speed roll and a high speed roll at an orientation ratio of 3.7 under a 900° C. IR heater disposed at a height of 15 mm above the film, and then coated with aqueous solutions having the following compositions, respectively.

The Side of the Surface A
  a copolyester (terephthalic acid/isophthalic acid/5-sodium sulfoisophthalic acid/ethyleneglycol/bisphenol A·two propyleneoxide adduct=97/1/2/60/40): 80 parts.
  acrylic particles (average particle diameter: 30 nm): 5 parts.
  SS-70 produced by Sanyo Kasei: 15 parts.
  thickness (after dried): 5 nm.

The Side of the Surface B
  a copolyester (terephthalic acid/isophthalic acid/5-sodium sulfoisophthalic acid/ethyleneglycol/bisphenol A·two propyleneoxide adduct=97/1/2/60/40): 60 parts.
  acrylic particles (average particle diameter: 40 nm): 10 parts.
  hydroxyethylmethylcellulose: 20 parts.
  Nonion NS-208.5 produced by Nippon Yushi: 10 parts.
  thickness (after dried): 20 nm.

Subsequently, the film was fed into a stenter, oriented at a orientation ratio of 4.9 in the transverse direction at 150° C., further oriented at a ratio of 1.14 in the transverse direction at 200° C. and simultaneously thermally treated to obtain the biaxially oriented film having a thickness of 4.7 μm, which is rolled as a jumbo roll. The obtained biaxially oriented film has a Ra of 0.7 nm on the surface A and 3.3 nm on the surface B. The thickness of the biaxially oriented film was measured by the online scanning of a transmitted β-ray attenuation method thickness meter in the width direction, and the measurement results were fed back to the temperatures of the die lips to control the thickness of the film. The jumbo roll was rerolled on a fiber-reinforced plastic (FWP) core into a film roll having a width of 0.500 m, a length of 9,000 m and a rolling hardness of 99 degree under conditions comprising a rolling tension of 10 kg/m, a rolling contact pressure of 140 kg/m, a rolling rate of 100 m/minute, an oscillation width of 0.100 m, and an oscillation rate of 0.010 m/minute. The fiber-reinforced plastic (FWP) core had a length of 0.550 m, a crown-like shape, a difference of $120 \times 10^{-6}$ m between the maximum diameter and the minimum diameter in the width direction, a flexural modulus of 15.7 GPa in the circumferential direction, a degree of surface roughness of 0.2 μm and a degree of surface hardness of 85 degree. The shape of the film roll in the width direction was measured with a bulk shape measurer manufactured by Kitano Kikaku (Ltd.). But, the shape of the roll did not satisfy the specifications of the present invention, and wrinkles were generated on the roll.

Example 1

A jumbo roll of a biaxially oriented film having a thickness of 4.7 μm was produced and then slit by the same method as in the comparative example 1 except that the roll shape of the obtained film roll was measured and then fed back for the adjustment of the temperatures of die lips and for the adjustment of the gap between the lips to reduce the thickness unevenness of the film. The shape of the obtained film roll in the width direction was measured. It was consequently found that the film roll had the roll shape satisfying the conditions of the present invention, and wrinkles were not recognized on the roll not only just after slit but also after the passage of 24 hours.

Comparative Example 2

On the production of the film in the comparative example 1, the film of the jumbo roll was rerolled on a fiber-reinforced plastic (FWP) core to form a film roll having a width of 0.620 m, a length of 7,000 m and a degree of rolling hardness of 98 degree under conditions comprising a rolling tension of 10 kg/m, a rolling contact pressure of 100 kg/m, a rolling rate of 100 m/minute, an oscillation width of 0.100 m, and an oscillation rate of 0.010 m/minute. The fiber-reinforced plastic (FWP) core had a length of 0.67 m, a crown-like shape, a difference of $150 \times 10^{-6}$ m between the maximum diameter and the minimum diameter in the width direction, a flexural strength of 15.7 GPa in the circumferential direction, a degree of surface roughness of 0.2 μm and a degree of surface hardness of 85 degree. The shape of the film roll in the width direction was measured with a bulk shape measurer manufactured by Kitano Kikaku (Ltd.). But, the shape of the roll did not satisfy the specifications of the present invention, and wrinkles were generated on the roll.

Example 2

A jumbo roll of a biaxially oriented film having a thickness of 4.7 μm was obtained and then slit by the same method as in the comparative example 2 except that the roll shape of the obtained film roll was measured and then fed back for the adjustment of the temperature of the die lips and for the adjustment of the gap between the die lips to flatten the unevenness of the roll shape and simultaneously reduce the thickness unevenness of the film. The shape of the obtained film roll in the width direction was measured. It was consequently found that the film roll had the roll shape satisfying the conditions of the present invention, and wrinkles were not recognized on the roll not only just after slit but also after the passage of 24 hours.

Comparative Example 3

On the production of the polyester film in the comparative example 1, the polyethylene 2,6-naphthalenedicarboxylate was changed into polyethylene terephthalate, and the polyethylene terephthalate was processed similarly except the following conditions to obtain a 6.4 μm thick biaxially oriented film. The conditions comprise a pellet drying time of 3 hours, a melting extrusion temperature of 295° C., a machine-direction orienting pre-heating temperature of 80° C., a longitudinal orientation ratio of 3.0, coating only the surface A with the same coating liquid as that coated on the surface A in the comparative example 1, transversely orienting the film at a orientation ratio of 3.3 at 105° C., further transversely orienting the film at a orientation ratio of 1.6 at 210° C., and simultaneously thermally treating the film. The Ra of the obtained biaxially oriented film was 0.7 nm on the surface A and 3.0 nm on the surface B. A film roll was produced under the same slitting condition as in the comparative example 1. But, the shape of the roll did not satisfy the conditions of the present invention, and wrinkles are generated on the roll.

Example 3

A jumbo roll of a 6.4 μm-thick biaxially oriented film was obtained and then slit by the same method as in the comparative example 3 except operations comprising measuring the shape of the obtained film roll, feeding back the measurement results to the temperature of the die lips and to the gap between the die lips to flatten the unevenness of the roll shape, and simultaneously controlling the thickness of the film. The shape of the obtained film roll in the width direction was measured. It was consequently found that the film roll had the roll shape satisfying the conditions of the present invention, and wrinkles were not recognized on the roll not only just after slit but also after the passage of 24 hours.

Comparative Example 4

On the production of the polyester film in the comparative example 1, a 4.7 μm-thick biaxially oriented polyester film was obtained by the same method as in the comparative example 1 except operations comprising changing the extrusion of polyethylene 2,6-naphthalenedicarboxylate substantially not containing inactive particles to the coextrusion of a raw material A comprising polyethylene 2, 6-naphthalenedicarboxylate substantially not containing inactive particles and a raw material B comprising polyethylene 2,6-naphthalenedicarboxylate substantially not containing inactive particles and containing 0.3 wt. % of silica particles having an average particle diameter of 300 nm in a thickness ratio of 3:2, and changing coating the surfaces A and B with the coating liquids to coating only the surface A with the same coating liquid as that coated on the surface A in the comparative example 1. The Ra of the obtained film was 1.3 nm on the surface A and 5.8 nm on the surface B. A film roll was produced under the same slitting condition as in the comparative example 1. But, the shape of the film roll did not satisfy the conditions of the present invention. The rolled appearance of the film roll was good just after slit, but wrinkles were generated on the roll after the passage of 24 hours.

Example 4

A jumbo roll of a 4.7 μm-thick biaxially oriented film was obtained and then slit by the same method as in the comparative example 4 except operations comprising measuring the roll shape of the obtained film roll, feeding back the measurement results to the temperatures of die lips and to the gap between the die lips to flatten the unevenness of the roll shape, and simultaneously controlling the thickness of the film. The shape of the obtained film roll in the width direction was measured. It was consequently found that the film roll had the roll shape satisfying the conditions of the present invention, and wrinkles were not recognized on the roll not only just after slit but also after the passage of 24 hours.

TABLE 1

| | | Roll | | | | The Rolled Appearance of the Roll | |
| --- | --- | --- | --- | --- | --- | --- | --- |
| | W [m] | L [m] | $2W \times 10^{-3}$ $[10^{-6}m]$ | $L \times 10^{-7}$ $[10^{-6}m]$ | R $[10^{-6}m]$ | Just after Slit | At the Passage of 24 hours after Slit |
| Example 1 | 0.500 | 9,000 | 1,000 | 900 | 300 | Very good | Very good |
| Example 2 | 0.620 | 7,000 | 1,240 | 700 | 220 | Very good | Very good |

TABLE 1-continued

| | Roll | | | | | The Rolled Appearance of the Roll | |
|---|---|---|---|---|---|---|---|
| | | | | | | | At the |
| | W [m] | L [m] | $2W \times 10^{-3}$ $[10^{-6}m]$ | $L \times 10^{-7}$ $[10^{-6}m]$ | R $[10^{-6}m]$ | Just after Slit | Passage of 24 hours after Slit |
| Example 3 | 0.500 | 9,000 | 1,000 | 900 | 250 | Very good | Very good |
| Example 4 | 0.500 | 9,000 | 1,000 | 900 | 350 | Very good | Very good |
| Comparative Example 1 | 0.500 | 9,000 | 1,000 | 900 | 1,200 | Bad | Bad |
| Comparative Example 2 | 0.620 | 7,000 | 1,240 | 700 | 810 | Bad | Bad |
| Comparative Example 3 | 0.500 | 7,000 | 1,000 | 700 | 950 | Bad | Bad |
| Comparative Example 4 | 0.500 | 9,000 | 1,000 | 900 | 1,030 | Good | Bad |

These results are shown in Table 1.

As apparent from Table 1, the polyester film roll of the present invention did not have wrinkles generated thereon, and had a good rolled appearance.

Comparative Example 5

The pellets of polyethylene 2,6-naphthalenedicarboxylate containing 0.02 percent by weight of calcium carbonate having an average particle diameter of 0.6 μm and 0.3 percent by weight of spherical silica particles having an average particle diameter of 0.1 μm were dried at 170° C. for 6 hours, fed into an extruder and then melted at 305° C. The melted polymer was filtered by a known method, extruded from a die having a lip gap of 60 mm, and then quenched and solidified on a casting drum to obtain the unoriented film. The unoriented film was preliminarily heated at 120° C., further heated with a 900° C. IR (infrared light) heater disposed at a 15 mm-high place, oriented at a ratio of 4.7 in the machine direction between a low speed roll and a high speed roll, fed into a stenter, oriented at a ratio of 5.0 in the transverse direction at 150° C., and then thermally treated at 200° C. to obtain the 6.0 μm-thick biaxially oriented film, which was rolled as a jumbo roll. The obtained biaxially oriented film had a Ra of 8 nm, a Young's modulus of 6.9 GPa in the machine direction and a Young's modulus of 7.2 GPa in the transverse direction. The thickness of the biaxially oriented film was measured by the online scanning of a transmitted β-ray attenuation method thickness meter in the width direction, and the measurement results were fed back to the temperatures of the die lips to control the thickness of the film. The film of the jumbo roll was rerolled on a fiber-reinforced plastic (FWP) core through a slitter under conditions comprising a rolling tension of 10 kg/m, a rolling contact pressure of 140 kg/m, a rolling rate of 100 m/minute, an oscillation width of 100 mm, and an oscillation rate of 0.010 m/minute to obtain the film roll having a width of 1.0 m, a length of 5,000 m and a degree of rolling hardness of 99 degree. The fiber-reinforced plastic (FWP) core had a length of 1.2 m, the maximum convex portion of 100 μm and the maximum concave portion of 100 μm in the width direction, a flexural strength of 15.7 GPa in the circumferential direction, a degree of surface roughness of 0.2 μm and a degree of surface hardness of 85 degree. The shape of the film roll in the width direction was measured with a bulk shape measurer manufactured by Kitano Kikaku (Ltd.), and a straight line was drawn between both the ends of the curved line of the measured diameters. Lines were vertically drawn from convex portions to the straight line, and among the lengths of the lines, the length of the maximum convex portion was 700 μm. Lines were also vertically drawn from concave portions to the straight line, and among the lengths of the lines, the length of the maximum concave portion was 400 μm. After the passage of 24 hours, the film was pulled out from the film roll, and the flatness of the film was examined. Consequently, the generation of Caterpillar rut-like wrinkles (slackened wrinkles) was recognized at the maximum convex portion, and the generation of longitudinal wrinkles was also found out at the maximum concave portion. Thus, the film was bad in the flatness, and had the problem in practical use.

Example 5

A jumbo roll of a biaxially oriented film was obtained and then slit to give a film roll by the same method as in the comparative example 5' except the employment of a die having a lip gap of 30 mm (the lip gap of the die was a half of that in the comparative example 5). The shape of the obtained film roll in the width direction was measured with a bulk shape measurer manufactured by Kitano Kikaku (Ltd.) by a similar method as in the comparative example 5. Among the lengths of lines which were obtained by measuring the shape of the film roll in the width direction, drawing a straight line between both the ends of the obtained curved line, and then vertically drawing the lines from the convex portions to the straight line, the length of the maximum convex portion was 450 μm, and among the lengths of lines which were similarly obtained by vertically drawing the lines from the concave portions to the straight line, the length of the maximum concave portion was 250 μm. After the passage of 24 hours, the film was pulled out from the film roll, and the flatness of the film was examined. Consequently, the generation of Caterpillar rut-like wrinkles (slackened wrinkles) was slightly recognized at the maximum convex portion, and the generation of longitudinal wrinkles was also slightly found out at the maximum concave portion. However, the Caterpillar rut-like wrinkles and the longitudinal wrinkles disappeared, when the film was lightly pulled. Thereby, the Caterpillar rut-like wrinkles and the longitudinal wrinkles did not cause a trouble in practical use.

Example 6

A jumbo roll of a biaxially oriented film was obtained and then slit to give a film roll by the same method as in the comparative example 5 except that the oscillation width was changed to 150 mm (lip gap×transverse orientation ratio).

The shape of the obtained film roll in the width direction was measured with a bulk shape measurer manufactured by Kitano Kikaku (Ltd.) by the same method as in the comparative example 5. Among the lengths of lines which were obtained by measuring the shape of the film roll in the width direction, drawing a straight line between both the ends of the obtained curved line, and then vertically drawing the lines from the convex portions to the straight line, the length of the maximum convex portion was 250 μm, and among the lengths of lines which were similarly obtained by vertically drawing the lines from the concave portions to the straight line, the length of the maximum concave portion was 150 μm. After the passage of 24 hours, the film was pulled out from the film roll, and the flatness of the film was examined. Consequently, the generation of Caterpillar rut-like wrinkles (slackened wrinkles) was not recognized at the maximum convex portion, and the generation of longitudinal wrinkles was also not found out at the maximum concave portion. Thereby, the flatness of the film was very good.

Example 7

A jumbo roll of a biaxially oriented film was obtained by the same method as in the example 6. The shape of the obtained film roll in the width direction was measured with a bulk shape measurer manufactured by Kitano Kikaku (Ltd.), and die lip heaters corresponding to the positions of the convex portions and concave portions of the obtained curved line of the roll shape were adjusted together with the online automatic control of a transmitted β-ray attenuation method thickness meter. The jumbo roll obtained thus was slit to give a film roll by the same method as in the example 6. The shape of the obtained film roll in the width direction was measured with the bulk shape measurer manufactured by Kitano Kikaku (Ltd.) by the same method as in the example 6. Among the lengths of lines which were obtained by drawing a straight line between both the ends of the obtained curved line and then vertically drawing the lines from the convex portions to the straight line, the length of the maximum convex portion was 200 μm, and among the lengths of lines which were similarly obtained by vertically drawing the lines from the concave portions to the straight line, the length of the maximum concave portion was 100 μm. After the passage of 24 hours, the film was pulled out from the film roll, and the flatness of the film was examined. Consequently, the generation of Caterpillar rut-like wrinkles (slackened wrinkles) was not recognized at the maximum convex portion, and the generation of longitudinal wrinkles was also not found out at the maximum concave portion. Thereby, the flatness of the film was very good.

Example 8

The pellets of polyethylene terephthalate containing 0.25 percent by weight of spherical silica particles having an average particle diameter of 0.1 μm and used for a layer A, and the pellets of polyethylene terephthalate containing 0.05 percent by weight of cross-linked silicone resin particles having an average particle diameter of 0.6 μm and 0.4 percent by weight of alumina particles having an average particle (secondary particle) diameter of 0.1 μm and used for a layer B were dried at 170° C. for 3 hours, fed into two extruder hoppers, respectively, melted at 300° C., and then extruded from a multi-manifold type coextruder die having a lip gap of 30 mm to obtain the sheet-like laminate where the layer A is laminated to one side of the layer B in a ratio of 7:3. The extruded sheet-like laminate was quenched and solidified on a casting drum to obtain the non-oriented film. The non-oriented film was preliminarily heated at 75° C., further heated with a 830° C. IR (infrared light) heater from a 14 mm-high place and simultaneously oriented at a ratio of 2.3 in the machine direction between a low speed roll and a high speed roll, quenched, fed into a stenter, oriented at a ratio of 3.6 in the transverse direction at 110° C., preliminarily heated at 110° C., oriented at a ratio of 2.5 between a low speed roll and a high speed roll, further fed into a stenter, and then thermally set at 210° C. for 10 seconds to obtain the 6.0 μm-thick biaxially oriented film, which was rolled as a jumbo roll. The biaxially oriented film had a surface roughness Ra of 4 nm on the surface A, a surface roughness Ra of 8 nm on the surface B, a Young's modulus of 7.8 GPa in the machine direction, and a Young's modulus of 4.7 GPa in the transverse direction. The shape of the obtained jumbo roll in the width direction was measured with the bulk shape measurer manufactured by Kitano Kikaku (Ltd.), and die lip heaters corresponding to the positions of the convex portions and concave portions of the obtained curved line of the roll shape were adjusted together with the online automatic control of a transmitted β-ray attenuation method thickness meter. The jumbo roll obtained thus was slit by the same method as in the example 7 except that the oscillation width was changed to 110 mm, thereby obtaining a film roll. The shape of the obtained film roll in the width direction was measured with the bulk shape measurer manufactured by Kitano Kikaku (Ltd.) by the same method as in the example 7. Among the lengths of lines which were obtained by drawing a straight line between both the ends of the obtained curved line and then vertically drawing the lines from the convex portions to the straight line, the length of the maximum convex portion was 150 μm, and among the lengths of lines which were similarly obtained by vertically drawing the lines from the concave portions to the straight line, the length of the maximum concave portion was 100 μm. After the passage of 24 hours, the film was pulled out from the film roll, and the flatness of the film was examined. Consequently, the generation of Caterpillar rut-like wrinkles (slackened wrinkles) was not recognized at the maximum convex portion, and the generation of longitudinal wrinkles was also not found out at the maximum concave portion. Thereby, the flatness of the film was very good.

Comparative Example 6

A jumbo roll of a biaxially oriented film was obtained, and then slit to give a film roll by the same method as in the comparative example 5 except that the oscillation ratio was changed to 150 mm. The shape of the obtained film roll in the width direction was measured with a bulk shape measurer manufactured by Kitano Kikaku (Ltd.) by the same method as in the comparative example 5. Among the lengths of lines which were obtained by drawing a straight line between both the ends of the obtained curved line, and then vertically drawing the lines from the convex portions to the straight line, the length of the maximum convex portion was 550 μm, and among the lengths of lines which were also similarly obtained by vertically drawing the lines from the concave portions to the straight line, the length of the maximum concave portion was 250 μm. After the passage of 24 hours, the film was pulled out from the film roll, and the flatness of the film was examined. Consequently, the generation of longitudinal wrinkles was slightly found out at the maximum concave portion. When the film was lightly pulled, the fine longitudinal wrinkles disappeared, and did not cause a trouble. However, the generation of Caterpillar rut-like wrinkles (slackened wrinkles) were recognized at the maximum convex portion to deteriorate the flatness of the film, and caused troubles in practical use.

Comparative Example 7

A jumbo roll of a biaxially oriented film was obtained by the same method as in the comparative example 5. The shape of the obtained jumbo roll in the width direction was measured with a bulk shape measurer manufactured by Kitano Kikaku (Ltd.), and die lip heaters corresponding to the positions of the convex portions and concave portions of the obtained curved line of the roll shape were adjusted together with the online automatic control of a transmitted β-ray attenuation method thickness meter. The jumbo roll obtained thus was slit to give a film roll by the same method as in the comparative example 5. The shape of the obtained film roll in the width direction was measured with the bulk shape measurer manufactured by Kitano Kikaku (Ltd.) by the same method as in the comparative example 5. Among the lengths of lines which were obtained by drawing a straight line between both the ends of the obtained curved line and then vertically drawing the lines from the convex portions to the straight line, the length of the maximum convex portion was 300 μm, and among the lengths of lines which were similarly obtained by vertically drawing the lines from the concave portions to the straight line, the length of the maximum concave portion was 350 μm. After the passage of 24 hours, the film was pulled out from the film roll, and the flatness of the film was examined. Consequently, the generation of Caterpillar rut-like wrinkles (slackened wrinkles) were not recognized at the maximum convex portion, but the generation of longitudinal wrinkles were found out at the maximum concave portion to deteriorate the flatness of the film was bad, and caused troubles in practical use.

These results are shown in the table 2. As apparent from the table 2, the polyester film roll of the present invention was free from the generation of wrinkles, had a good rolled appearance, and did not cause a trouble in practical use.

TABLE 2

|  | Unit | E. 5 | E. 6 | E. 7 | E. 8 | C.E. 5 | C.E. 6 | C.E. 7 |
|---|---|---|---|---|---|---|---|---|
| Polymer Layer Constitution |  | PEN Single Layer | PEN Single Layer | PEN Single Layer | PET Two Layers | PEN Single Layer | PEN Single Layer | PEN Single Layer |
| Surface Roughness | | | | | | | | |
| Layer A | [nm] | 7 | 7 | 7 | 4 | 7 | 7 | 7 |
| Layer B | [nm] | 7 | 7 | 7 | 9 | 7 | 7 | 7 |
| Total Ratio | | | | | | | | |
| # 1 | [Ratio] | 4.7 | 4.7 | 4.7 | 5.75 | 4.7 | 4.7 | 4.7 |
| # 2 | [Ratio] | 5.0 | 5.0 | 5.0 | 3.6 | 5.0 | 5.0 | 5.0 |
| # 3 | [nm] | 30 | 30 | 30 | 30 | 60 | 60 | 60 |
| # 4 | [nm] | 100 | 150 | 150 | 108 | 100 | 150 | 100 |
| Roll Size | | | | | | | | |
| Film Width | [mm] | 1,000 | 1,000 | 1,000 | 1,000 | 1,000 | 1,000 | 1,000 |
| Film Length | [m] | 5,000 | 5,000 | 5,000 | 5,000 | 5,000 | 5,000 | 5,000 |
| Roll Shape | | | | | | | | |
| # 5 | [μm] | 450 | 250 | 200 | 150 | 700 | 550 | 300 |
| # 6 | [μm] | 250 | 150 | 100 | 100 | 400 | 250 | 350 |
| Rolled Appearance of the Film Roll | | | | | | | | |
| #7 | | Good | Very Good | Very Good | Very Good | Bad | Bad | Good |
| #8 | | Good | Very Good | Very Good | Very Good | Bad | Good | Bad |

E.: Example
C.E.: Comparative Example
1: Ratio in the Machine Direction
2: Ratio in the Transverse Direction
3: Die Lip Heater Distance
4: Oscillation Width
5: Maximum Convex Portion
6: Maximum Concave Portion
7: Longitudinal Wrinkles
8: Slackened Wrinkles According to the present invention, a polyester film roll, which does not generate wrinkles and slacks with the passage of time, gives narrow slit film-products having accurate widths, and has a good rolled appearance even with flat surfaces, can be provided, without the problems that the characteristics of a film must be changed as a countermeasure for a good rolled shape of a film roll, and that the characteristics of a film is also changed to improve the conventional technical problems, such as, wrinkles and slacks are generated with the passage of time, even if they are not found during rolling of the film; the width of the slit film for a magnetic tape is partially narrowed after being slit from a wide film; and the development of the technologies for rolling a flat thin film is extremely difficult, so that they are not applied for commercial production. Thereby, the industrial value of the present invention is high.

The invention claimed is:
1. A polyester film roll comprising:
a roll of polyester film, said polyester film being rolled onto a core,
wherein said core has a maximum outer diameter and a minimum outer diameter, the difference between said maximum and minimum outer diameters of the core being not more than $300 \times 10^{-6}$ m.
2. The polyester film roll described in claim 1, wherein said maximum and minimum outer diameters of the core are along the width direction of the core.

3. The polyester film roll described in claim 1, wherein said maximum outer diameter of the core is at a central portion of the core.

4. The polyester film roll described in claim 3, wherein said minimum outer diameter of the core is at an end portion of the core.

5. The polyester film roll described in claim 1, wherein the flexural modulus of said core in the circumferential direction is not less than 13 Gpa.

6. The polyester film roll described in claim 1, wherein the surface roughness of said core is not more than 0.6 μm.

7. The polyester film roll described in claim 1, wherein the degree of surface hardness of the core is not less than 65 degree.

8. The polyester film roll described in claim 1, wherein the degree of rolling hardness of said roll is 90 to 100.

9. The polyester film roll described in claim 1, wherein the difference between a maximum outer diameter of the roll and a minimum outer diameter of the roll is not more than $2W \times 10^{-3}$ and not more than $L \times 10^{-7}$, "W" being the width of the roll and "L" being the rolled length of the polyester film.

10. The polyester film roll described in claim 9, wherein said maximum and minimum outer diameters of the roll are along the width direction of the roll.

11. The polyester film roll described in claim 9, wherein said rolled length of said polyester film is not less than 4,000 m.

12. The polyester film roll described in claim 9, wherein said width of the roll is not less than 300 mm.

13. The polyester film roll described in claim 1, wherein the surface roughness of said polyester film is 1 to 10 nm.

14. The polyester film roll described in claim 1, wherein the thickness of said polyester film is 2 to 10 nm.

15. The polyester film roll described in claim 1, wherein said polyester film contains inactive particles.

16. The polyester film roll described in claim 15, wherein said inactive particles is from the group consisting of calcium carbonate particles, alumina particles, spherical silica particles, and titanium oxide particles, and organic particles represented by cross-linked silicone resin particles, cross-linked polystyrene resin particles, cross-linked acrylic resin particles, cross-linked polyester resin particles, cross-linked styrene-acrylic resin particles, polyimide particles, melamine resin particles.

17. The polyester film roll described in claim 15, wherein said inactive particles an average particle diameter of said inactive particles is not less than 0.01 μm and not more than 2.0 μm.

18. The polyester film roll described in claim 15, wherein a content of said inactive particles is not less than not less than 0.001 percent by weight and not more than 2.0 percent by weight.

19. The polyester film roll described in claim 1, wherein said polyester film supports a magnetic recording medium.

20. The polyester film roll described in claim 19, wherein a coating layer is between said polyester film and said magnetic recording medium.

21. The polyester film roll described in claim 19, wherein said magnetic recording medium is a ferromagnetic metal thin film layer.

22. The polyester film roll described in claim 19, wherein said magnetic recording medium is a digital recording method magnetic recording medium.

23. The polyester film roll described in claim 1, wherein a plurality of diameters of said roll along the width direction of the roll is represented by a curved line having ends, a straight line connecting said ends of the curved line, wherein a maximum length from a maximum convex portion of said curved line to said straight line is not more than 500 μm.

24. The polyester film roll described in claim 23, wherein a maximum length from a maximum concave portion of said curved line to said straight line is not more than 300 μm.

* * * * *